(12) United States Patent
Miloser

(10) Patent No.: US 10,169,061 B2
(45) Date of Patent: Jan. 1, 2019

(54) SCALABLE AND FLEXIBLE OPERATING SYSTEM PLATFORM

(71) Applicant: Ford Global Technologies, LLC, Dearborn, MI (US)

(72) Inventor: Jim Miloser, Saline, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 83 days.

(21) Appl. No.: 14/705,288

(22) Filed: May 6, 2015

(65) Prior Publication Data

US 2016/0328173 A1    Nov. 10, 2016

(51) Int. Cl.
*G06F 9/455*    (2018.01)

(52) U.S. Cl.
CPC .......... *G06F 9/45545* (2013.01); *G06F 2009/45587* (2013.01)

(58) Field of Classification Search
CPC .... G06F 3/0673; G06F 3/0664; G06F 3/0653; G06F 3/0637; G06F 3/0622; G06F 3/0604; G06F 3/0632; G06F 9/45545; G06F 2009/45587
See application file for complete search history.

(56) References Cited

U.S. PATENT DOCUMENTS

| | | | |
|---|---|---|---|
| 8,219,653 B1* | 7/2012 | Keagy | G06F 8/63 709/222 |
| 8,418,230 B1 | 4/2013 | Cornelius et al. | |
| 2003/0204550 A1* | 10/2003 | Lutter | G01S 19/37 718/102 |
| 2008/0295095 A1* | 11/2008 | Watanabe | G06F 11/0712 718/1 |
| 2010/0292867 A1* | 11/2010 | Bohm | B60W 50/06 701/1 |
| 2011/0159393 A1 | 6/2011 | Takemoto et al. | |
| 2012/0054744 A1* | 3/2012 | Singh | G06F 21/53 718/1 |
| 2012/0131519 A1* | 5/2012 | Jitkoff | G06F 3/0481 715/863 |
| 2012/0266209 A1 | 10/2012 | Gooding et al. | |
| 2012/0290702 A1 | 11/2012 | Vincent | |
| 2012/0331461 A1 | 12/2012 | Fries et al. | |
| 2014/0136826 A1* | 5/2014 | Paek | G06F 9/4401 713/1 |

FOREIGN PATENT DOCUMENTS

EP    2761523 A1    8/2014

* cited by examiner

*Primary Examiner* — Larry T MacKall

(74) *Attorney, Agent, or Firm* — Brandon Hicks; Bejin Bieneman PLC

(57) ABSTRACT

A computer includes at least one bootloader program that includes instructions to instantiate a management layer that includes a first operating system kernel and a virtual machine manager that executes in the context of the operating system kernel. The management layer includes instructions to instantiate, after the management layer is running, at least one second operating system that executed in the context of the virtual machine manager.

7 Claims, 2 Drawing Sheets

SCALABLE AND FLEXIBLE OPERATING SYSTEM PLATFORM

BACKGROUND

Existing computing platforms, e.g., for in-vehicle computers that manage a variety of applications, including applications that control core vehicle operations such as throttle control, steering control etc., as well as applications for in-vehicle entertainment systems, information systems, etc., rely on an operating system being very tightly coupled with hardware used by the application. Thus, for a platform supporting such variety of applications, use of different software development environments, different software development methods, etc., is often impractical. Moreover, as a consequence, developing and releasing new software content can be slow, expensive, and unwieldy.

DRAWINGS

DETAILED DESCRIPTION

Introduction

Figure 1:
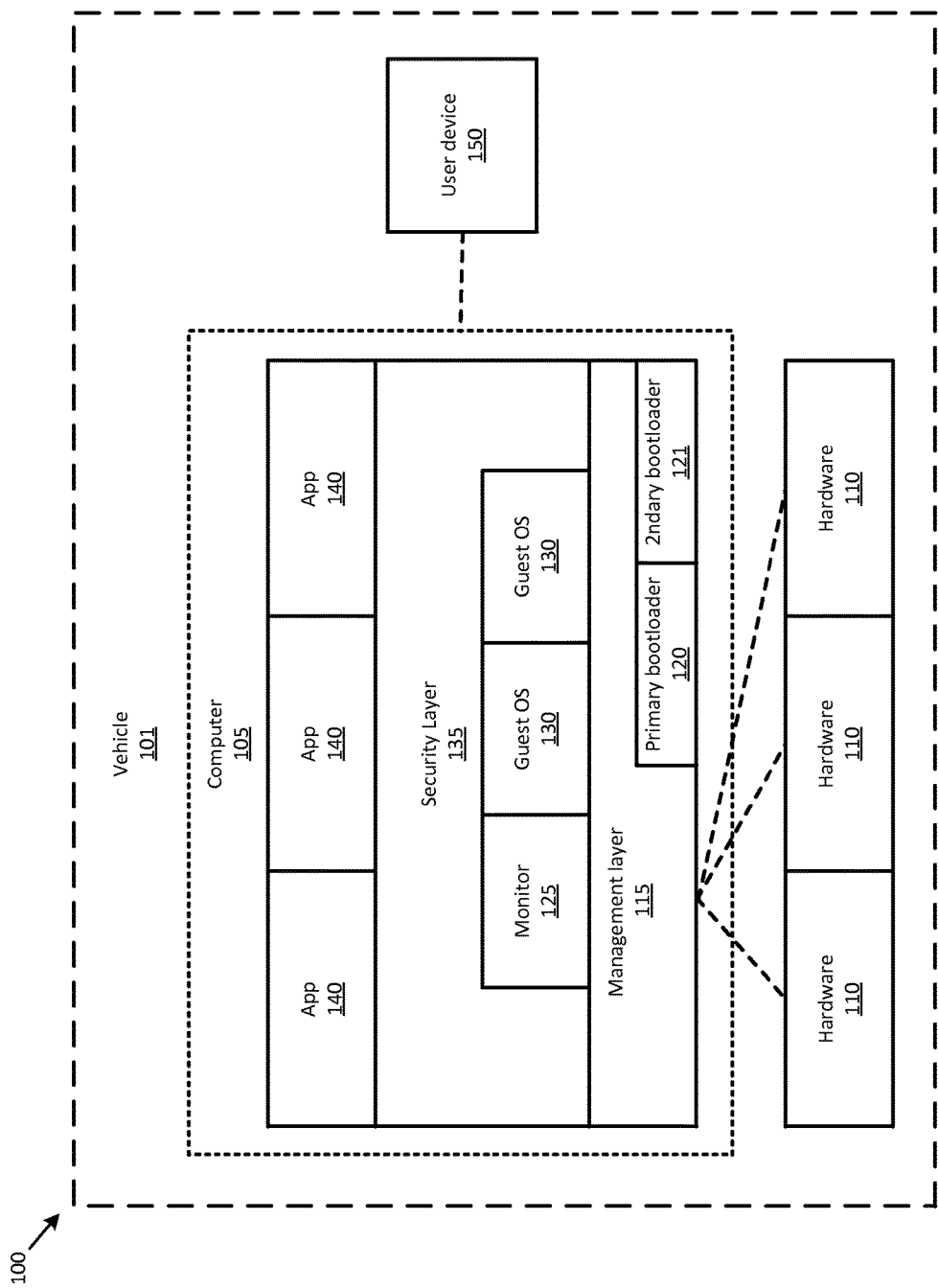
FIG. 1 is a block diagram of an exemplary vehicle computing system.

FIG. 1 is a block diagram of a vehicle 101 computing system 100. A computer 105 that may be installed in a vehicle 101 is communicatively coupled to a plurality of hardware components 110. Programming of the computer 105 includes a management layer 115 that may be instantiated by a primary boot loader 120 and/or a secondary boot loader 121. The management layer 115 advantageously includes a virtual machine manager such as hypervisor or the like coupled to a micro-kernel operating system that communicates with a monitor 125, one or more guest operating systems 130, as well as, via a security layer 135, a plurality of applications 140.

By providing multiple operating systems 130 communicating through the security layer 135, and with the management layer 115, the presently disclosed architecture of the system 100 advantageously allows for application 140 development relating to different operating systems 130 to be done and implemented on a single, scalable platform. As a further advantage, modifying, removing, replacing, or adding a hardware component 110 may require modification to a particular application 140 and/or guest operating system 130, but need not affect other components of the disclosed architecture. Accordingly, an original equipment manufacturer such as a vehicle manufacturer will benefit from increased flexibility and efficiency, and will be able to develop and release applications 140 desired by customers more quickly, and at a lower cost, then was previously possible.

System Elements

A vehicle 101 computer 105 generally includes a processor and a memory, the memory including one or more forms of computer-readable media, and storing instructions executable by the processor for performing various operations, including as disclosed herein. For example, as already mentioned, the computer 105 may be communicatively coupled to one or more hardware components 110. Alternatively or additionally, although the hardware components 110 are shown in FIG. 1 as being separate from the computer 105, the components 110 could be included in, e.g., removable / swappable modules of, the computer 105. In any event, hardware components 110 may include a variety of vehicle 101 hardware 110, e.g., controllers, actuators, sensors, navigation systems, environmental controls, entertainment interfaces, etc., that may be controlled, accessed, provide information to, etc., an application 140 in a vehicle 101. Further, although the computer 105 is described herein as being an in-vehicle computing device, it is to be understood that the architecture disclosed herein as implemented in the computer 105 in the vehicle 101 could be implemented in other environments, and that the computer 105 and/or hardware 110, and communications there-between, need not be in the context of a vehicle.

Assuming that the hardware components 110 are communicatively coupled to the computer 105 in a vehicle 101, a vehicle 101 communication network such as is known, e.g., a controller area network (CAN) bus, onboard diagnostics connector e.g., OBD-II, and/or other wired or wireless mechanisms such as Wi-Fi, Bluetooth, etc., the computer 105 may transmit messages to various devices in a vehicle and/or receive messages from the various Alternatively or additionally, in cases where the computer 105 actually comprises multiple devices, the CAN bus or the like may be used for communications between devices represented as the computer 105 in this disclosure. In addition, the computer 105 may be configured for communicating with other devices via various wired and/or wireless networking technologies, e.g., cellular, Bluetooth, a universal serial bus (USB), wired and/or wireless packet networks, etc.

The management layer 115, as mentioned above, includes a virtual machine manager (VMM) such as is known, e.g., sometimes referred to as "hypervisor" or "a hypervisor." In particular, hypervisor is known for allowing a single computer 105 to provide multiple operating systems 130, generally referred to as guest OS's, as is known. Further, the management layer 115 includes what is referred to as a "micro-kernel" that is instantiated by the primary boot loader 120 and/or the secondary boot loader 121, to govern operations of the hypervisor. The micro-kernel, which runs natively in the computer 105, i.e., is not run in the context of the hypervisor or other VMM (and in fact the converse is true, i.e., the VMM is instantiated by and executed in the micro-kernel), advantageously adds to known hypervisor functionality in the management layer 115, e.g., providing interrupt management, device driver management, and process management.

As is known, the primary boot loader 120 is generally provided for initial boot-up of the computer 105, e.g., for setting register values in a memory of the computer 105, for obtaining values from the secondary boot loader 121 to write to the memory, etc. As such, the primary boot loader 120 generally is difficult to update and/or modify, e.g., can only be modified according to a cumbersome manual process. However, the secondary boot loader 121, which includes drivers for specific hardware 110 devices, generally can be updated, e.g., according to changes in hardware components 110. For example, a secondary boot loader 121 could be updated according to a download initiated by a guest OS 130 to provide updates to support the guest OS 130. Advantageously, in the presently disclosed architecture, the boot loaders 120, 121 can be used to instantiate the management layer 115, e.g., the micro-kernel which then instantiates the hypervisor, and then, after this, instantiate the guest OSs 130. Accordingly, the management layer 115, utilizing the micro-kernel, provides a hardware-generic operating system as opposed to the hardware-specific guest OS's.

The monitor 125 is provided to monitor and analyze computing performance of the computer 105, e.g., when various applications 140 are being executed. In general, the monitor 125 measures and analyzes benchmarks and thresholds and the like for various tasks that an OS 130 performs and executing an application 140, such as are known. Likewise, the monitor 125 may perform load-balancing as is known in execution of processes in the computer 105.

The guest OS's 130 may be a variety of operating systems such as are known, e.g., an operating system designed for use by a vehicle 101 computer 105 to control vehicle 101 components, e.g., AUTOSAR (AUTomotive Open System ARchitecture) OS, and an in-vehicle infotainment (IVR) operating system such as the QNX operating system, etc. Support of multiple guest operating systems 130 in a vehicle 101 computer 105 provides a number of advantages. Different applications 140 may be developed using different development environments and/or tools. Accordingly, an application 140 can be added, deleted, or modified without impacting elements of the system 100 other than a particular guest OS 130. Further, one guest OS 130 can be stopped, restarted, put into a new state, e.g., into a debug state from a run state, etc., without affecting any other guest OS 130. Yet further, different guest OSs 130 may have different access rights to hardware 110, portions of memory or devices associated with the computer 105, etc., e.g., a file system, a universal serial bus (USB) driver, etc.

The security layer 135 controls communications between applications 140 and the management layer 115. For example, the security layer 135 may register an application 140 with the management layer 115 according to a unique identifier or the like. Further, the security layer 135 may include instructions identifying a type of application 140, and permissions for the application 140 to access a particular guest OS 130. Such a security mechanism is desirable in the vehicle 101 to prevent applications 140 from accessing and/or modifying or controlling data and/or hardware components 110 improperly. For example, it would be undesirable for a vehicle entertainment application 140 to be able to access data available via a CAN bus or data related to operations of the vehicle 101. Accordingly, when an application 140 is instantiated, the security layer 135 obtains from the monitor 125 an identification of a guest OS 130 to be used for the application 140, but moreover can override the indication from the monitor 125 if the security layer 135 determines that the app 140 should not be allowed access provided by the identified guest OS 130. For example, the security layer 135 may include a table or the like stored in a memory of the computer 105 indicating whether an application 140 has permission to access one or more operating systems 130. Further, once a guest OS 130 is selected for the app 140, the security layer 135 can communicate directly with the management layer 115 to request instantiation of the indicated guest OS 130.

Applications 140 may be a variety of computer programs executing in the computer 105 as described above. For example, an application 140 may be provided to operate hardware 110 included in a vehicle 101 entertainment system, a vehicle 101 navigation system, and/or vehicle 101 hardware, such as throttle, steering, etc.

Further, applications 140 may receive input from and/or provide output to one or more user devices 150. A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communications capabilities to communicate via the network 120 and also directly with a vehicle computer 105, e.g., using an in-vehicle communications mechanism, e.g., Bluetooth. Accordingly, the computer 105 could control access to one or more applications on a device 150 in communication with the computer 105.

Process

Figure 2:
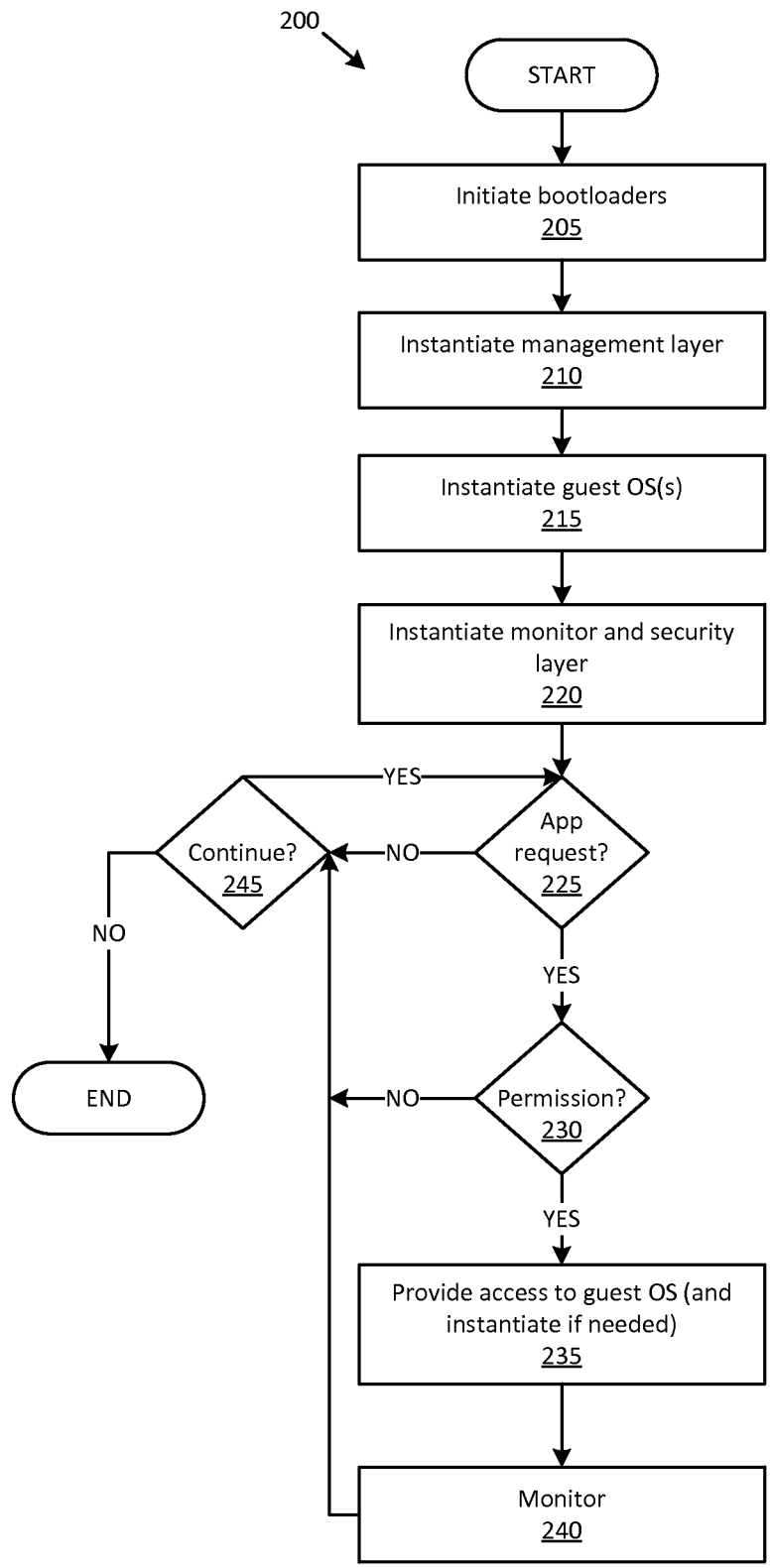
FIG. 2 is a diagram of an exemplary process for managing and/or executing applications in a vehicle computer.

FIG. 2 is a diagram of an example process 200 for managing and/or executing applications in a vehicle computer. The process 200 begins in a block 205, in which a boot up of the computer 105 is initiated, e.g., the computer 105 is powered on upon vehicle 101 startup, and boot loaders 120, 121 are initiated.

Next, in a block 210, the management layer 115 is instantiated. As mentioned above, the management layer 115 includes instructions to perform operations of an operating system, sometimes referred to as a micro-kernel, as well as a VMM. Upon instantiation of the management layer 115, initiated by the boot loaders 120, 121, the micro-kernel is first instantiated, and then in turn instantiates the VMM, e.g., a hypervisor such as is known.

Next, in a block 215, the management layer 115, i.e., the VMM, instantiates one or more guest OS's 130. For example, an AUTOSAR OS 130 or the like may be instantiated upon boot up of the computer 105 to interact with various vehicle hardware components 110, e.g., speed control components, environmental controls, etc. Further, a guest OS 130 may be instantiated upon boot up of the computer 105 based on data received and recorded by the monitor 125 during a prior session or sessions of the computer 105. For example, the monitor 125 may record that an app 140 required startup of a particular guest OS 130 during one or more sessions of the computer 105, i.e., one or more instances when a computer 105 was booted up and then powered down, and based on such recorded data the guest OS 130 may be instantiated on subsequent boot ups of the computer 105. Further for example, the monitor 125 may measure an efficiency by which an app 140 executes within a particular guest OS 130, and, if the efficiency falls below a predetermined threshold, e.g., a processing time to perform a particular task or set of tasks, may provide a different guest OS 130 for a subsequent execution of the app 140.

Next, in a block 220, the monitor 125 and security layer 135 are instantiated.

Next, in a block 225, the computer 105 determines whether it has received a request from an application 140 for execution and/or access of a hardware component 110, data such as vehicle 101 data, etc. If such a request has been received, then a block 230 is executed next. Otherwise, the process 200 proceeds to a block 245.

In the block 230, the computer 105, e.g., according to instructions included in the security layer 135, determines whether the app 140 making the request of the block 225 has permission to access requested data, perform requested operations, and or use a guest OS 130 that can be used for execution of the app 140. For example, the security layer 135 may maintain a table or the like identifying apps 140 and permissions, e.g., to access data, hardware 110 in the vehicle 101, etc. As will be understood, different guest OSs 130 will have different rights and abilities to access different hardware 110, data, etc. in the vehicle 101. For example, an IVI OS 130 may have limited or no ability to access data from a vehicle 101 CAN bus, whereas an AUTOSAR OS 130 will have such rights and abilities. If the app 140 does not have appropriate permissions for the request, then the process 200 proceeds to the block 245. Otherwise, the process 200 proceeds to a block 235.

In the block 235, the security layer 135 informs the management layer 115 that access to a guest OS 130 may be provided to the requesting app 140, whereupon the management layer 115 instantiates the guest OS 130 (if the requested guest OS 130 is not already running) and provides access to the requesting app 142 the guest OS 130.

Following the block 235, in a block 240, the monitor 125 performs monitoring operations as described above. Following the block 240, the process 200 proceeds to the block 245.

In the block 245, the computer 105 determines whether the process 200 should continue. For example, the computer 105 may be powered off, e.g., upon power-off of a vehicle 101. If the process 200 continues, then the process 200 returns to the block 225. Otherwise, the process 200 ends following the block 245.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer having a processor and a memory, wherein the memory includes:
   at least one bootloader program that includes instructions to instantiate a management layer that includes a first operating system kernel and a virtual machine manager that executes in the context of the operating system kernel;
   instructions in the management layer to instantiate, after the management layer is running, at least one second operating system that executed in the context of the virtual machine manager; and wherein the memory of the computer further includes at least one application; and
   at least one security layer that includes instructions for receiving, from at least one application, a request to instantiate and execute, and for identifying a guest operating system to instantiate and execute the at least one application;
   wherein the at least one boot loader program includes a primary boot loader and a secondary boot loader, wherein the secondary boot loader includes instructions for receiving updates to support the guest operating system according to a download initiated by the guest operating system.

2. The system of claim 1, further comprising at least one hardware component communicatively coupled to the computer, wherein the security layer further includes instructions for informing the management layer that the at least one application has permission to access the at least one hardware component.

3. The system of claim 2, wherein the at least one hardware component includes one of a vehicle speed controller, a vehicle brake controller, a vehicle navigation system, a vehicle environmental control, and a vehicle entertainment system.

4. The system of claim 1, wherein the computer is installed in a vehicle.

5. The system of claim 1, wherein the security layer further includes instructions for informing the management layer that the at least one application has permission be executed in the context of the guest operating system, and further wherein the management layer further includes instructions for determining whether the at least one second operating system includes the guest operating system and performing one of granting to the at least one application access to the guest operating system and instantiating the guest operating system.

6. The system of claim 1, wherein the memory of the computer further includes a monitor application that records data related to execution of at least one application.

7. The system of claim 6, wherein the management layer includes instructions to identify the at least one second operating system at least in part according to the recorded data related to execution of the at least one application.

\* \* \* \* \*